FIG. I.

UNITED STATES PATENT OFFICE.

ROBERT WILLIAM MACCULLOCH, OF WEST KIRBY, AND FREDERICK GASH, OF DOUGLAS, ENGLAND.

WHEEL-HUB.

SPECIFICATION forming part of Letters Patent No. 667,984, dated February 12, 1901.

Application filed June 26, 1899. Serial No. 721,387. (No model.)

*To all whom it may concern:*

Be it known that we, ROBERT WILLIAM MACCULLOCH, residing at West Kirby, in the county of Chester, and FREDERICK GASH, residing at Douglas, in the Isle of Man, England, subjects of the Queen of Great Britain, have invented certain new and useful Improvements in Wheel-Hubs, of which the following is a specification.

This invention has for its object to form a cycle or other like vehicle wheel in such a manner that its hub shall in great measure absorb the shocks and vibrations resulting from the movement of the vehicle on the road.

The invention will be understood from the following description, reference being had to the accompanying drawings, in which—

Figure 1:
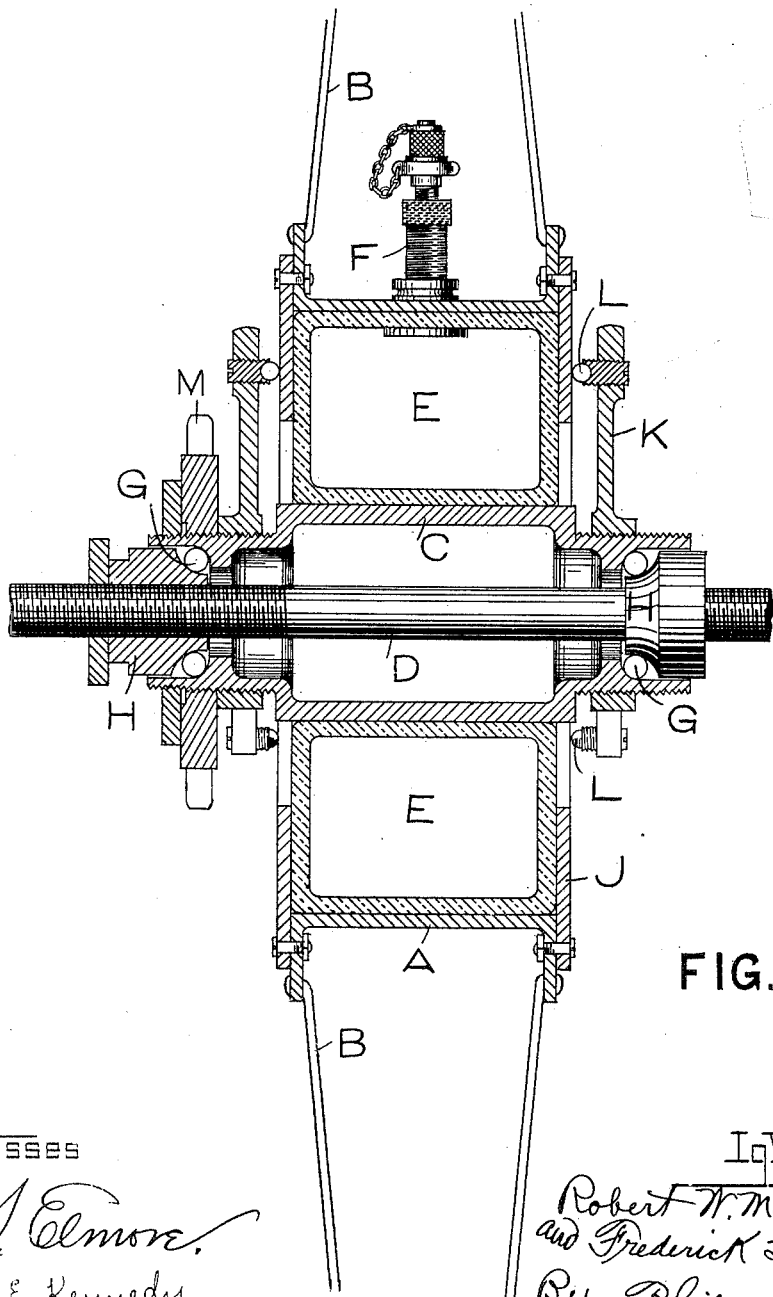
Figure 2:
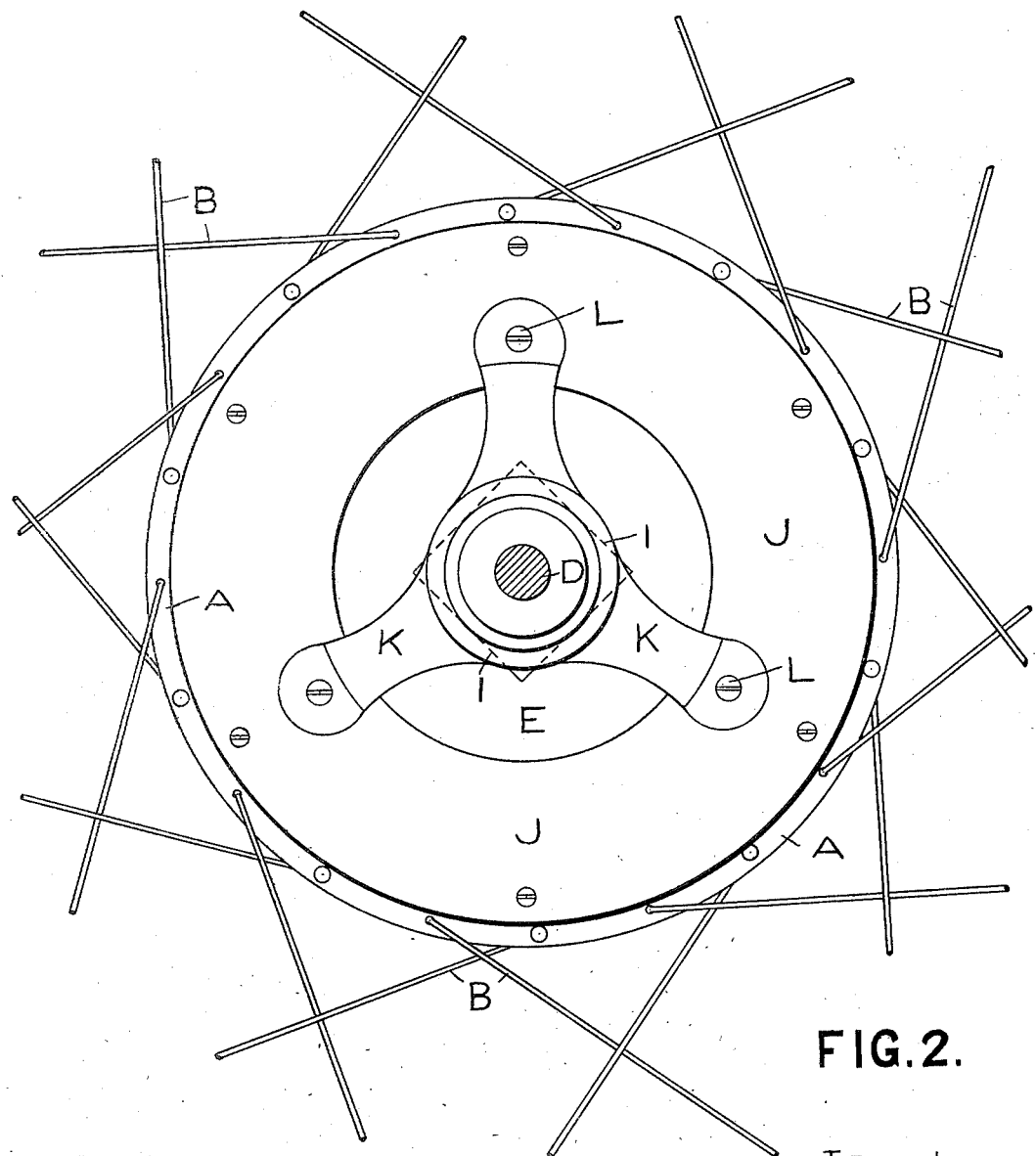

Figure 1 is a vertical cross-section of our invention applied to a cycle-wheel; Fig. 2, a front elevation.

Referring to the figures, we so mount and arrange the wheel-center in two concentric parts A and C separate from each other (we will for clearness call that part of the wheel-center to which the spokes B are attached the "nave" A and that part in which the spindle or axle bearing D is situated the "hub" C) that there is an annular space between them, which is filled with an elastic cushion E to absorb the vibration transmitted from the tire or rim to the hub or spindle, and thence to the rider. This cushion is preferably on the pneumatic principle, as shown, and is provided with a valve F for inflating it with air. The nave A is constructed of larger diameter than usual, the spokes B being joined to the nave and to the wheel-rim in any suitable manner. The bearings on the rotatable hub C and stationary spindle D are of any suitable construction, either ball-bearings, rollers, or the ordinary bush. In the drawings ball-bearings are shown, consisting of balls G, working between the cones H and the hub. The hub is constructed of steel, iron, or other suitable material, having its center part square, as shown by dotted lines at I. On this center part of the hub is placed the annular elastic cushion E, having a square or other shaped hole in the center fitting onto the correspondingly-shaped part I of the hub, so that the two parts are locked together. Secured to each side of the nave A by means of bolts is an annular flange J, and secured to the hub, near each end, are radiating arms K, having bearings L, which bear against the face of flanges J and resist lateral movement, while in no way interfering with the resiliency of the hub. These radiating arms are secured to the hub so as to rotate with the same, and as they press firmly against the flanges J of the nave they assist in making the wheel revolve in unison with the hub, so that the entire force needed to revolve the wheel does not pass through the air-cushion E from the square-shaped hub, but part of it is communicated direct to the flange L and so to the nave. M is the sprocket-wheel for the chain. The pneumatic cushion when inflated presses tightly against the inside of the nave A and against the flange J, so as practically to lock it with those parts.

We declare that what we claim is—

In a wheel, the combination with the hub, of the nave, a pneumatic cushion interposed between said parts, flanges carried by said nave to maintain said cushion in position, arms carried by the hub and adjustable toward and from said flanges and removable devices carried by said arms and bearing against said flanges to prevent lateral motion of the parts, substantially as described.

In witness whereof we have hereunto signed our names this 7th and 16th days of June, respectively, 1899, in the presence of the subscribing witnesses.

ROBERT WILLIAM MACCULLOCH.
FREDERICK GASH.

Witnesses to signature of Robert William Macculloch:
  G. C. DYMOND,
  W. H. BEESTON.

Witnesses to signature of Frederick Gash:
  WM. HY. CLUCAS,
  JOHN WM. STEPHEN.